United States Patent
Tye et al.

(10) Patent No.: US 6,229,007 B1
(45) Date of Patent: May 8, 2001

(54) AMINE FUNCTIONAL CELLULOSE ESTER COMPOUNDS AND METHODS OF MAKING THE SAME

(75) Inventors: Anthony J. Tye, Waterville, OH (US); Gerald L. Bajc, Hackettstown, NJ (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/410,911

(22) Filed: Sep. 30, 1999

(51) Int. Cl.[7] .............................. C08B 3/00; C07H 1/00; C08L 1/08
(52) U.S. Cl. .......................... 536/32; 536/124; 106/162.7
(58) Field of Search .................... 536/32, 124; 106/162.7

(56) References Cited

U.S. PATENT DOCUMENTS 5,871,573 * 2/1999 Cook et al. .

* cited by examiner

*Primary Examiner*—Elli Peselev
(74) *Attorney, Agent, or Firm*—Mary E. Golota

(57) ABSTRACT

Disclosed are amine functional cellulose ester resins and methods of making the same. The amine functional cellulose ester resins comprise at least one repeat unit of the structure:

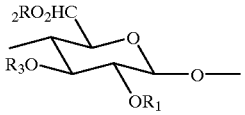

wherein $R_1$, $R_2$, and $R_3$ are selected independently from the group consisting of hydrogen, $R_4C\!=\!O$, and

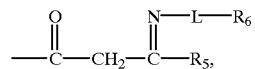

wherein at least one of $R_1$, $R_2$, and $R_3$ is hydrogen, at least one of $R_1$, $R_2$, and $R_3$ is $R_4C\!=\!O$, and at least one of $R_1$, $R_2$, or $R_3$ have the structure

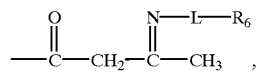

$R_4$ is selected from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups, L is a divalent linking group and $R_6$ is selected from the group consisting of H and compounds having at least one secondary amine group, tertiary amine group, and mixtures thereof.

10 Claims, No Drawings

AMINE FUNCTIONAL CELLULOSE ESTER COMPOUNDS AND METHODS OF MAKING THE SAME

FIELD OF THE INVENTION

The present invention provides amine functional cellulose ester compounds and compositions containing such amine functional cellulose ester compounds. The invention also provides a method of making an amine functional cellulose ester compound, a method of dispersing a pigment, and a method of obtaining an improved appearance in a cured pigmented coating.

BACKGROUND OF THE INVENTION

Coatings applied to surfaces typically serve decorative and/or protective functions. This is particularly so for automotive finishes, which must provide an esthetically appealing appearance while simultaneously meeting and maintaining rigorous performance and durability requirements. As used herein, "automotive coating or finish" encompasses both original equipment (OEM) coatings and refinish coatings, but especially to refinish coatings, the later term referring to coatings which are applied after the car has left the manufacturer, usually for repair purposes. It will be appreciated that refinish coatings often have different application and performance parameters.

Pigments are used in coatings to provide decorative and/or protective functions. As used herein, "pigment" refers to a fine, insoluble white, black, or colored material, typically suspended in a vehicle for use in a paint or ink. The term "pigment" may also include effect pigments such as micas, metallic pigments such as aluminum, opalescent pigments, and the like.

Dry pigments comprise a mixture of primary particles, aggregates, and agglomerates that must be wetted and de-aggregated before dispersion forces can take full effect and enable the production of a stable, pigmentary dispersion in the medium of choice. Aggregates, or primary pigment particles joined face-to-face, must be reduced to their fundamental primary particle. An ideal dispersion consists of a homogeneous suspension of primary particles. See *Organic Pigments, Federation Series on Coatings Technology, $2^{nd}$ Edition*, Lewis, P. October 1988, Revised March 1995, pgs. 39–41, hereby incorporated by reference.

Although pigments are acknowledged as a required component in many coatings, their presence may be a possible contributing factor to a variety of problems in liquid coatings and/or dry paint films. Examples of coatings/paint film defects thought to be attributable to pigments include: undesirable gloss due to aggregates, blooming, pigment fading, pigment flocculation and/or settlement, separation of pigment mixtures, 'pigment shock' in millbases, instability in pigment suspensions, brittleness, moisture susceptibility, fungal growth susceptibility, and/or thermal instability. See *Physical-Chemical Aspects of Pigment Applications, Surface Coating Reviews*, Guthrie, James T., and Lin, Long, Oil & Colour Chemists' Association, 1994, Sections 4.3.1–4.3.2, hereby incorporated by reference.

It has been recognized that the level of dispersion in a particular pigment containing coating composition affects the application properties of the wet composition as well as the optical properties of the cured film. Improvements in dispersion have been shown to result in improvements in gloss, color strength, brightness, and gloss retention. *Dispersion—the neglected parameter. JOCCA*, W. Carr, 65, 373 (1982).

The prior art has long sought improved pigment dispersions for use in coating compositions, particularly with respect to pigments that are difficult to disperse such as carbon black and transparent oxides.

The use of cellulose esters in organic solvent borne coatings has been known to impart desired properties such as improved pigment dispersions, improved metallic flake orientation, improved solvent release, and higher gloss coatings. They are also known to function as rheology control agents in solvent borne coating formulations.

U.S. Pat. No. 3,959,193 discloses a combination of an aryl sulfonamide-formaldehyde resin and film forming material, such as cellulose acetate butyrate, which may further include a surfactant, such as a non-ionic surfactant including, for example, an alkylarylpolyether, as a "universal" dispersant for resin additives, such as pigment materials. The composition generally includes 40 to 90 weight percent of any of various types of additives, including pigments.

U.S. Pat. No. 5,521,304 provides water soluble or water dispersible cellulose acetoacetate esters prepared by contacting a cellulose material with diketene, an alkyl acetoacetate, 2,2,6-trimethyl-4H-1,3-dioxin-4-one or a mixture thereof and a carboxylic anhydride in a solvent system comprising lithium chloride plus a carboxamide. Compositions containing the cellulose acetoacetate esters are disclosed to be useful for coating applications.

Amine-containing cellulose esters, eg, the acetate N,N-diethylaminoacetate and propionate morpholinobutyrate have been suggested for use in controlled-release, rumen-protected feed supplements for ruminants. Such esters are prepared by the addition of the appropriate amine to the cellulose acylate crotonate ester or by replacement of the chlorine on cellulose acylate chloroacetate esters with amines. However, such amine containing cellulosic materials are not taught to be useful in coating compositions nor do they suggest the particular compositions of the invention. They lack an enamine structure, hydroxyl groups and the use of mixed acetate/butyrate esters.

Eastman Chemical Products, Inc's Publication No. X-263A, December, 1986, pgs. 2–3, discusses the possible reactions of acetoacetylated polymers. The carbonyl group of the acetoacetylated polymers is said to chelate with metals such as zinc, tin, lead, aluminum, copper and zirconium. Polyvalent cations are taught to useful for crosslinking purposes. In addition, the preparation of enamines by the reaction of amines with carbonyl groups is taught. Diamines are shown to crosslink acetoacetylated polymers.

Despite these prior art attempts, there still exists a need for improved pigment dispersion, especially with respect to the dispersion of certain pigments intended for use in topcoat finishes. Topcoat finishes require a high quality of color depth and richness, especially with pigments such as carbon black and the like. Such high quality of color depth and richness, known as "jetness" with respect to carbon black, has been difficult to obtain in an efficient and cost effective manner with prior art dispersants and dispersion processes. "Jetness" as used herein refers to a clean looking color with blue undertones.

Accordingly, it is desirable to obtain an improved dispersion with respect to pigmented coating compositions. It is further desirable to obtain such improved dispersion with an agent that is economical and easily obtained. More particularly, it is desirable to obtain a dispersant for use with pigments, especially hard to disperse pigments such as carbon black, which would provide coatings having an improved appearance, especially as to color and/or jetness, when pigments dispersed with such a dispersant are incorporated into the coating.

SUMMARY OF THE INVENTION

It has surprisingly been found that these and other objects are obtained with the use of the present invention which provides a composition comprising an amine functional cellulose ester resin, the amine functional cellulose ester resin comprising at least one repeat unit of the structure:

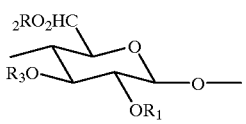

wherein $R_1$, $R_2$, and $R_3$ are selected independently from the group consisting of hydrogen, $R_4C=O$, and

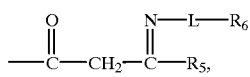

wherein at least one of $R_1$, $R_2$, and $R_3$ is hydrogen, at least one of $R_1$, $R_2$, and $R_3$ is $R_4C=O$, and at least one of $R_1$, $R_2$, or $R_3$ groups have the structure

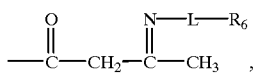

preferably 0.5% to 10% by weight of the total weight of the amine functional cellulose ester being of $R_1$, $R_2$, or $R_3$ groups having the structure

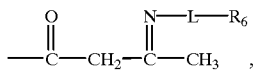

$R_4$ is selected from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups, L is a divalent linking group and $R_6$ is selected from the group consisting of H and compounds having at least one secondary amine group, tertiary amine group and mixtures thereof.

The invention further provides a method of making the amine functional cellulose ester of the invention wherein a cellulose acetoacetate ester resin is provided, the resin comprising one or more repeat units of the structure

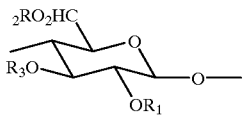

wherein $R_1$, $R_2$, and $R_3$ are selected independently from the group consisting of hydrogen, acetoacetyl, and $R_4C=O$, $R_4$ is selected from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups, at least one of $R_1$, $R_2$, and $R_3$ is $R_4C=O$, at least 0.5 percent of the total weight of the cellulose ester resin is of $R_1$, $R_2$, or $R_3$ groups which are acetoacetyl and at least one or more of $R_1$, $R_2$, and $R_3$ is H. This cellulose ester resin is then reacted with an amine functional compound comprising at least one primary amine group to provide an amine functional cellulose ester resin.

The invention also provides a method of dispersing a pigment in a resin, wherein one or more pigments are ground, i.e., are subject to a means for reducing and maintaining the average particle size of the pigment, in the presence of the amine functional cellulose ester resin of the invention.

Finally, the invention discloses a method of providing a cured pigmented coating having an improved appearance. The method requires the application and curing of a coating composition comprising a least one pigment that has been dispersed in the presence of the amine functional cellulose ester resin of the invention. The resulting cured pigmented coating has an appearance with respect to color (jetness in the case of black pigments) which is improved relative to a similar coating which contains pigment which has not been dispersed in the presence of the amine functional cellulose ester resin of the invention.

DETAILED DESCRIPTION OF THE INVENTION

The instant invention(s) requires the use of a particular amine functional cellulose ester resin. This amine functional cellulose ester resin is the reaction product of a cellulose ester comprising at least one acetoacetyl group and an amine functional compound comprising at least one primary amine.

As used herein, the term "acetoacetyl" group refers to

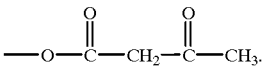

The terms "acetoacetonate" and "acetoacylate" are intended to be equivalent to and interchangeable with "acetoacetyl".

The acetoacetyl group may be obtained via the direct acetoacylation of raw cellulose as described in U.S. Pat. Nos. 5,292,877, 5,420,267, 5,521,304, and 5,595,591 all of which are hereby incorporated by reference. These patents disclose water soluble or water dispersible cellulose acetoacetate esters prepared by contacting a cellulose material with diketene, an alkyl acetoacetate, 2,2,6-triemethyl-4H-1,3-dioxin-4-one or a mixture thereof and a carboxylic anhydride in a solvent system comprising lithium chloride plus a carboxamide.

Alternatively, the required cellulose acetoacetate ester may be obtained via the acetoacylation of previously esterified cellulose material.

Cellulose esters are known in the art and are commercially available from Eastman Kodak of Kingsport, Tenn. and Bayer of Pittsburg, Pa. Suitable cellulose esters for use in the instant invention are those resulting from the reaction of cellulose with organic acids, anhydrides, and acid chlorides. Methods for making cellulose esters are discussed in *Cellulose Esters, Organic,* Encyclopedia of Polymer Science and Engineering, Vol. 3, pgs, 158–181.

Suitable cellulose esters for use in the instant invention are those having the following structure:

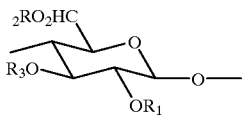

wherein $R_1$, $R_2$, and $R_3$ are selected independently from the group consisting of hydrogen and $R_4C=O$; $R_4$ is selected from the group consisting of $C_1-C_{20}$ alkyl groups, $C_1-C_{20}$ phenyl groups, $C_1-C_{20}$ napthyl groups, and $C_1-C_{20}$ alkenyl groups; and at least one of $R_1$, $R_2$, and $R_3$ is H. Preferably, the remaining $R_1$, $R_2$, and $R_3$ that are not H are different. Preferred for use as $R_4$ are the $C_1-C_{20}$ alkyl groups, especially the $C_1-C_{10}$ alkyl groups, and most preferably the $C_1-C_6$ alkyl groups. Most preferred cellulose esters are mixed cellulose esters such as cellulose acetate butyrate (CAB) and cellulose acetate propionate (CAP).

Cellulose esters suitable for use in the instant invention may also be characterized by particular physical and/or performance parameters such as the number of acyl groups per repeating unit, acyl chain unit length, and the degree of polymerization or molecular weight (number average). In general, suitable performance and/or physical parameters are a viscosity of from 0.01 to 20 sec, (per ASTM D817 (Formula A) and D 1343) a % Acetyl of from 0.6 to 20, more preferably from 2 to 14, (per ASTM D817), a % butyryl of from 17 to 53, more preferably from 35 to 53, (per ASTM D817), a % hydroxyl of from 0.8 to 5.0, more preferably from 1.0 to 2.0, a $T_g$ of from 50 to 200 degrees C., more prefereably from 80 to 135 degrees C., and a number average molecular weight value of from 10,000 to 70,000, more preferably from 15,000 to 40,000, based on a polystyrene equivalent molecular weight determined using size exclusion chromatography.

Suitable cellulose esters include those commercially available from Eastman Chemicals, i.e., CAB 551-0.01, CAB 531-1, CAB-381-0.5 and CAB-381-2.

The necessary acetoacetate group may be placed on a suitable cellulose ester such as described above via reaction with a compound containing an acetoacetate group. Examples of such compounds are alkyl acetoacetates having alkyl groups with from 1 to 20 carbons, preferably 1 to 10 carbons and most preferably from 1 to 6 carbons. Examples of suitable alkylacetoacetates are tert-butyl acetoacetate, methyl acetoacetate, ethyl acetoacetate and the like. Preferred acetoacetate group-containing compounds are tert-butyl acetoacetate.

The desired cellulose ester resin is modified with from 0.5% to 10% alkyl acetoacetate, based on the total weight of the cellulose ester resin. More preferably from 0.5 to 5.0%, and most preferably from 0.5 to 2.0% of alkyl acetoacetate is used, based on the total weight of the cellulose ester resin. It will thus be appreciated that some repeating units of the total cellulose ester resin may not comprise any R1 or R2 or R3 groups which have been modified with the acetoacetate group. However, from 0.5 to 10%, more preferably from 0.5 to 5% and most preferably from 0.5 to 2.0% of the total weight of the cellulose ester resin will have sites wherein a hydroxyl group has been replaced with an acetoacetate group.

Methods of incorporating the acetoacetate group into the cellulose ester include transesterification as described below and direct reaction of a hydroxyl group with a diketene.

A preferred method of incorporating the acetoacetate group into a suitable cellulose ester requires incorporation of a commercially available cellulose ester and a high boiling point, good cutting solvent such as ethyl 3-ethoxypropionate (EEP), PM acetate, EXXATE solvents and the like. Most preferably, ethyl 3-ethoxypropionate is used. After removal of water, an alkyl acetoacetate is added along with additional EEP. The resultant acetoacetylated cellulose ester is collected along with removal of the alkyl alcohol.

The acetoacetate group-containing cellulose ester is reacted with at least one amine functional compound to provide the amine functional cellulose ester resin of the invention. Suitable amine functional compounds will comprise at least one primary amine group. More preferably, the amine functional compounds will comprise at least one or more additional amine groups selected from the group consisting of secondary amine groups and tertiary amine groups, and mixtures thereof. Amines containing both a primary amine group and a tertiary amine group, as well as those containing a primary amine group, a secondary amine group and a tertiary amine group are most preferred.

Examples of suitable amine functional compounds for use herein include N-methylethylenediamine; N-ethylethylenediamine; N,N-diethylethylenediamine; N,N-dibutylethylenediamine; N-methyl,1,3-propanediamine; N-propyl, 1,3-propanediamine; N-isopropyl, 1,3-propanediamine; 3-dimethylaminopropylamine; 3-diethylaminopropylamine; 3-dibutylaminopropylamine; N,N,2,2-tetramethyl-1,3-propanediamine; N-cyclohexyl-1,3-propanediamine; 2-(2-aminoethylamino)ethanol; 2-(2-aminoethyl)-1-methylpyrrolidine; 1-(2-aminoethyl)pyrrolidine; 1-(2-aminoethyl)piperidine; 1-(2-aminoethyl)piperazine; 4-(2-aminoethyl)morpholine, and mixtures thereof. Preferred amine functional compounds are 1-(2-aminoethyl) piperazine and 4-(2-aminoethyl)morpholine. A most preferred amine functional compound is 1-(2-aminoethyl) piperazine.

The amine functional compound will be used in the reaction with the acetoacetate functional cellulose ester in an amount such that all of the acetoacetate groups will be amine functionalized. At least 95% by weight of the acetoacetate groups will be modified with the amine functional group, preferably at least 98%, and most preferably 100%, based on the total weight of the acetoacetate groups present in the cellulose ester resin.

Thus, from 0.5 to 10% by weight of amine functional compound should be used, based on the total weight of acetoacetylated cellulose ester. More preferably, from 0.5 to 5.0% by weight should be used and most preferably from 0.5 to 2.0% by weight, based on the total weight of acetoacetylated cellulose ester.

Accordingly, the amine functional cellulose ester resin of the invention is characterized by a structure having at least one repeat unit:

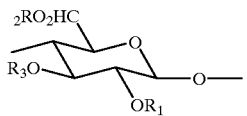

wherein $R_1$, $R_2$, and $R_3$ are selected independently from the group consisting of hydrogen, $R_4C=O$, and

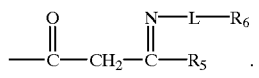

At least one of $R_1$, $R_2$, and $R_3$ is hydrogen. At least one of $R_1$, $R_2$, and $R_3$ is $R_4C=O$, and preferably at least two of $R_1$, $R_2$, and $R_3$ is $R_4C=O$. At least one repeat unit in the instant resin will have at least one of $R_1$, $R_2$, or $R_3$ groups being

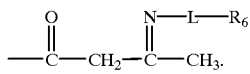

Most preferably, at least 0.5% by weight of the total weight of the amine functional cellulose ester will be of $R_1$, $R_2$, or $R_3$ groups having the structure:

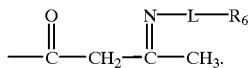

It will thus be appreciated that some individual repeating units of the total resin may not comprise any $R_1$, $R_2$, or $R_3$ groups having the structure

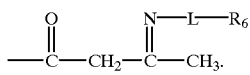

However, the invention requires only that from 0.5 to 10% by weight of the total polymer, more preferably 0.5 to 5.0% and most preferably 0.5 to 2.0% be comprised of $R_1$, $R_2$, or $R_3$ groups having the structure

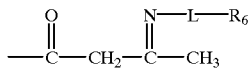

based on the total weight of the polymer.

In the above formula, $R_4$ is selected from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups. Preferably $R_4$ is selected from the group consisting of $C_1$–$C_{20}$ alkyl groups, and most preferably is selected from the group consisting of $C_1$–$C_6$ alkyl groups.

$R_6$ is selected from the group consisting of H and compounds having at least one amine group selected from the group consisting of secondary amine groups, tertiary amine groups and mixtures thereof. Preferably $R_6$ will be selected from the group of compounds having at least one amine group selected from the group consisting of secondary amine groups, tertiary amine groups and mixtures thereof. Most preferably, $R_6$ will be a secondary or tertiary amine group.

L is a divalent linking group having from 1 to 20 carbons atoms and from 0 to 10 heteroatoms selected from the group consisting of oxygen, nitrogen, and mixtures thereof. Illustrative examples of suitable L groups are aliphatic or cycloaliphatic linking groups of from 1 to 20 carbons, aromatic linking groups of from 1 to 10 carbons, and mixtures thereof. Preferred L groups include aliphatic or cycloaliphatic groups of from 2 to 10 carbons having from 0 to 5 heteroatoms.

The amine functional cellulose esters of the invention may be used in coating compositions containing one or more pigments, pigment pastes, and mixtures thereof. Pigment pastes may be defined as compositions containing at least 0.2% by weight of pigment, based on the total weight of the composition.

When used in pigment pastes, the amine functional cellulose esters of the invention will typically be used in an amount of from 2 to 15, preferably from 5 to 10, and most preferably from 7 to 8% by weight, based on the total weight of the pigment paste.

The amine functional cellulose esters of the invention may be used in coating compositions containing one or more pigments, pigment pastes, and mixtures thereof.

Typically, the pigment desired to be dispersed is subject to an action which decreases the average particle size of the pigment, in the presence of the amine functional cellulose ester of the invention. Such actions may be referred to as grinding or dispersion. Pigments are generally ground to a certain "fineness" of grind. Fineness of grind is often measured by the absence of "seeds" on a grind gauge, tint strength, or absence of pigment flocculation upon application. Encapsulation of the ground pigment particle is believed to prevent reagglomeration.

After grinding or the like, additional resins, solvents and additives may be added to the pigment paste.

Examples of coating compositions in which the instant cellulose esters may used include coating compositions include primers, basecoats, and/or clearcoats which are one component, two component or multicomponent systems and may include OEM coatings and refinish coatings.

Those of skill in the art will appreciate that such coatings may used over variety of substrates such as metal, plastic, previously painted substrates, and mixtures thereof, and may be subjected to variety of curing schemes including ambient cure, elevated temperature cures, and/or radiation.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise noted. All percentages are by weight unless otherwise noted.

EXAMPLES

Example I

A 5-liter, 3-necked round-bottom flask was fitted with an agitator, thermocouple probe, inert gas inlet, reflux condenser, Dean-Stark distillation receiver and heating mantle. The flask was charged with a mixture of 950 g of Eastman Chemical Co.'s cellulose acetobutyrate (CAB) #531.01 and 645 g. ethyl 3-ethoxypropionate (EEP). An additional 25 g of EEP was placed in the distillation receiver. The water content in the CAB was removed by heating the mixture slowly with stirring under an inert nitrogen atmosphere to a temperature of 158° C. About 5 g of water was collected in the distillation receiver and drained off. The temperature of the solution was then lowered to 120° C. with continued stirring, and a mixture of 8.95 g. tert-butyl acetoacetate (TBAA—Eastman Chemical Co.) and 30.0 g. EEP was added slowly from a dropping funnel over a period of 30 minutes. Reaction mixture temperature was then increased to about 150° C. and about 3 g of byproduct tert-butanol was collected in the distillation receiver. Some of the t-butanol crystallized in long needles.

A mixture of 269 g. xylene and 288 g. butyl acetate was added to the acetoacetate-functional polymer and the temperature reduced to 60° C. with continued stirring. A solution of 7.2 g. aminoethylpiperazine dissolved in 13.8 g butyl acetate was added slowly from a dropping funnel, while maintaining stirring of the reaction mixture and a temperature of 60°–67° C. After heating the reaction mixture for one hour at 60° C., 1822 g methyl isobutyl ketone was added with stirring. The flask was then cooled to 25° C. The product with mixed hydroxy and amino functionality was a viscous amber colored solution with a measured viscosity of 150 Stokes and a measured solids content of 23.25%.

Example 2

A 5-liter flask fitted as in Example I was charged with 944.5 g of Eastman Chemical's CAB #551.01 and 404.8 g of ethyl 3-ethoxypropionate (EEP), with an additional 25 g of EEP in the distillation receiver. Water was removed by heating and stirring under nitrogen to a temperature of 158° C. and draining off about 9.3 ml water from the distillation receiver. After heating to 167° C. to refill the distillation receiver with EEP, the temperature was lowered to about 140° C. and a mixture of 18.9 tert-butyl acetoacetate and 5.0 g. EEP added over 30 minutes. About 8 ml tert-butanol distilled into the receiver. The temperature was raised to 150° C. and a total amount of about 12.0 g of a combination of liquid and crystallized tert-butanol was collected.

A mixture of 405 g xylene and 390 g butyl acetate was added to the flask and the temperature reduced to 60° C. before dropping in 15.1 g of aminoethylpiperazine. The temperature was held at 60° C. for an additional three hours, then 1336 g of methyl isobutyl ketone was added before cooling.

The product was an amber liquid (color: Gardner 6) with a measured solids level of 30.05% and Gardner/Holdt viscosity of 132.5 centistokes.

Examples 3, 4, 5

A variety of different cellulose acetobutyrates were treated as described in Example 2. The following table lists the amino-functional materials produced:

| Example | Raw Mati. CAB[1] | Product Solids % | Color Gardner | Visc (GAII) Stokes |
|---|---|---|---|---|
| Example 3 | 381.5 | 25.58 | 5–6 | 24.85 |
| Example 4 | 531.01 | 25.70 | 5 | 59.13 |
| Example 5 | 381.02 | 22.34 | 6 | 148 |

[1]The number refers to the Eastman Chemical's product codes for cellulose acetate butyrate materials.

Example 6

A mixture of 252 G of Eastman Chemical's CAB #551.01 and EEP was reduced in water content, treated with t-butylacetoacetate and diluted with xylene and butyl acetate as described in Example 2. The resulting solution containing acetoacetate-functional polymer was held at 31° C., then to it was added 1.4 g of dimethylaminopropyl amine dissolved in 15.0 g of butyl acetate. The mixture was heated to 117° C. and cooled while 144.2 g methyl isobutyl ketone was added in steps. The product was a dark amber liquid with solids level of 29.4% and viscosity of 140 centistokes.

Example 7

A charge of 950 g of Eastman Chemical's CAB #531.1 and 644 g EEP (with an additional 30 g EEP) in the distillation receiver) was heated to 160° C. About 2 g water was collected in the distillation receiver. The reaction mixture was cooled to about 140° C. then to it was added 30 g t-butylacetoacetate and 15 g cyclohexane. The temperature was raised to 160° C. over a two-hour period. About 2 g 1-butanol was collected in the distillation receiver. The solution was then diluted with a mixture of 410 g butyl acetate and 390 g xylene and cooled to 60° C.

A solution of 14.8 g aminoethylmorpholine and 15.0 g butyl acetate was dropped in over about 15 minutes and the temperature maintained at 60°–67° C. for an additional three hours before 1625 g methyl isobutyl ketone was added. The product was an amber liquid with measured solids content of 23.4% and viscosity of 27 Stokes.

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. A method of making an amine or imine functional cellulose ester resin, comprising providing a cellulose ester resin comprising one or more repeat units of the structure

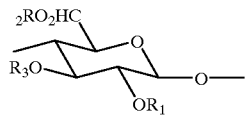

wherein $R_1$, $R_2$, and $R_3$ are selected independently from the group consisting of hydrogen, acetoacetyl, and $R_4C=O$, $R_4$ is selected from the group consisting of $C_1$–$C_{20}$ alkyl groups, $C_1$–$C_{20}$ phenyl groups, $C_1$–$C_{20}$ napthyl groups, $C_1$–$C_{20}$ alkenyl groups, and mixtures there of, at least one of $R_1$, $R_2$, and $R_3$ is $R_4C=O$, at least one of $R_1$, $R_2$, and $R_3$ is H, and at least 0.5 to 10% of the total weight of the cellulose ester resin is of $R_1$, $R_2$, and $R_3$ groups which are acetoacetyl, and, reacting the cellulose ester resin with an amine functional compound comprising at least one primary amine group to provide an amine or imine functional cellulose ester resin comprising at least one repeat unit of the structure:

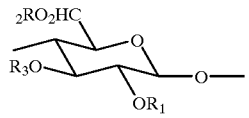

wherein $R_1$, $R_2$, and $R_3$ are selected independently from the group consisting of hydrogen, $R_4C=O$, and

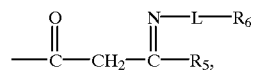

wherein at least one of $R_1$, $R_2$, and $R_3$ is hydrogen, at least one of $R_1$, $R_2$, and $R_3$ is $R_4C=O$, and at least one of $R_1$, $R_2$, and $R_3$ is $$-\overset{O}{\underset{\|}{C}}-CH_2-\overset{N-L-R_6}{\underset{\|}{C}}-CH_3, \quad \text{and}$$

$R_4$ is selected from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups, $R_6$ is selected from the group consisting of H and compounds having at least one primary, secondary, or tertiary amine group, and L is a divalent linking group having from 1 to 20 carbons atoms and from 0 to 10 heteroatoms selected from the group consisting of oxygen, nitrogen, and mixtures thereof.

2. The method of claim 1 wherein the amine functional compound comprises at least one primary amine and at least one pendent amine group selected from the group consisting of secondary amine groups, tertiary amine groups, and mixtures thereof.

3. The method of claim 1 wherein the amine functional compound is reacted with the cellulose ester resin in an amount equal to the amount of acetoacetate groups present in the cellulose ester resin.

4. The method of claim 1 wherein $R_4$ is selected from the group consisting of $C_1$–$C_{10}$ alkyl groups.

5. The method of claim 4 wherein $R_4$ is selected from the group consisting of $C_2$–$C_6$ alkyl groups and mixtures thereof.

6. The method of claim 4 wherein the amine functional compound is selected from the group consisting of 1-(2-aminoethyl)piperazine and 4-(2-aminoethyl)morpholine.

7. An amine or imine functional cellulose ester resin, the amine or imine functional cellulose ester resin comprising at least one repeat unit of the structure:

[Structure: pyranose ring with $_2RO_2HC$, $R_3O$, $OR_1$ substituents, O linkage]

wherein $R_1$, $R_2$, and $R_3$ are selected independently from the group consisting of hydrogen, $R_4C=O$, and $$-\overset{O}{\underset{\|}{C}}-CH_2-\overset{N-L-R_6}{\underset{\|}{C}}-R_5,$$

wherein
at least one of $R_1$, $R_2$, and $R_3$ is hydrogen,
at least one of $R_1$, $R_2$, and $R_3$ is $R_4C=O$, and
at least one of $R_1$, $R_2$, and $R_3$ is $$-\overset{O}{\underset{\|}{C}}-CH_2-\overset{N-L-R_6}{\underset{\|}{C}}-CH_3, \quad \text{and}$$

$R_4$ is selected from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups, $R_6$ is selected from the group consisting of H and compounds having at least one primary, secondary, or tertiary amine group, and L is a divalent linking group having from 1 to 20 carbons atoms and from 0 to 10 heteroatoms selected from the group consisting of oxygen, nitrogen, and mixtures thereof.

8. The amine or imine functional cellulose ester resin of claim 7 comprising from 0.5 to 10% by weight of of $R_1$, $R_2$, and $R_3$ groups having the structure:

$$-\overset{O}{\underset{\|}{C}}-CH_2-\overset{N-L-R_6}{\underset{\|}{C}}-CH_3.$$

9. A composition, the composition comprising an amine or imine functional cellulose ester resin, the amine functional cellulose ester resin comprising at least one repeat unit of the structure:

[Structure: pyranose ring with $_2RO_2HC$, $R_3O$, $OR_1$ substituents, O linkage]

wherein $R_1$, $R_2$, and $R_3$ are selected independently from the group consisting of hydrogen, $R_4C=O$, and $$-\overset{O}{\underset{\|}{C}}-CH_2-\overset{N-L-R_6}{\underset{\|}{C}}-R_5,$$

wherein
at least one of $R_1$, $R_2$, and $R_3$ is hydrogen,
at least one of $R_1$, $R_2$, and $R_3$ is $R_4C=O$, and
at least one of $R_1$, $R_2$, and $R_3$ is $$-\overset{O}{\underset{\|}{C}}-CH_2-\overset{N-L-R_6}{\underset{\|}{C}}-CH_3, \quad \text{and}$$

$R_4$ is selected from the group consisting of $C_1$–$C_{20}$ alkyl groups, $C_1$–$C_{20}$ phenyl groups, $C_1$–$C_{20}$ napthyl groups, and $C_1$–$C_{20}$ alkenyl groups, $R_6$ is selected from the group consisting of H and compounds having at least one primary, secondary, or tertiary amine group, and L is a divalent linking group having from 1 to 20 carbons atoms and from 0 to 10 heteroatoms selected from the group consisting of oxygen, nitrogen, and mixtures thereof.

10. The amine or imine functional cellulose ester resin of claim 7 wherein $R_6$ is selected from the group consisting of compounds having at least one primary, secondary, or tertiary amine group.

* * * * *